United States Patent
DeLuca et al.

(10) Patent No.: US 9,432,324 B2
(45) Date of Patent: Aug. 30, 2016

(54) ESTABLISHING AN AUTOMATIC COMMUNICATIONS DELAY BASED ON SOCIAL OR BUSINESS NETWORK FACTORS

(71) Applicant: International Business Machines Corporation, Armonk, NY (US)

(72) Inventors: Lisa Seacat DeLuca, San Francisco, CA (US); Geetika T. Lakshmanan, Winchester, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 13/752,867

(22) Filed: Jan. 29, 2013

(65) Prior Publication Data

US 2014/0214971 A1 Jul. 31, 2014

(51) Int. Cl.
*H04L 12/58* (2006.01)

(52) U.S. Cl.
CPC ............. *H04L 51/32* (2013.01); *H04L 51/26* (2013.01)

(58) Field of Classification Search
USPC ........................................... 709/206
See application file for complete search history.

(56) References Cited

U.S. PATENT DOCUMENTS

| | | | |
|---|---|---|---|
| 5,349,662 A * | 9/1994 | Johnson et al. | 717/127 |
| 6,622,116 B2 | 9/2003 | Skinner et al. | |
| 7,225,193 B2 | 5/2007 | Mets et al. | |
| 7,243,130 B2 * | 7/2007 | Horvitz et al. | 709/207 |
| 7,313,229 B1 | 12/2007 | Sherwood | |
| 7,529,683 B2 | 5/2009 | Horvitz et al. | |
| 7,818,374 B2 | 10/2010 | Bates et al. | |
| 7,882,191 B2 * | 2/2011 | Sood | 709/206 |
| 8,862,676 B1 | 10/2014 | Bilinski et al. | |
| 2004/0128359 A1 * | 7/2004 | Horvitz et al. | 709/207 |
| 2004/0254998 A1 | 12/2004 | Horvitz | |
| 2007/0004385 A1 * | 1/2007 | Horvitz et al. | 455/414.1 |
| 2007/0100947 A1 | 5/2007 | Chen et al. | |
| 2008/0205620 A1 | 8/2008 | Odinak et al. | |
| 2008/0288589 A1 | 11/2008 | Ala-Pietila | |
| 2009/0006561 A1 * | 1/2009 | Burckart et al. | 709/206 |
| 2009/0313346 A1 * | 12/2009 | Sood | 709/207 |
| 2010/0113073 A1 | 5/2010 | Schlesener et al. | |
| 2010/0217817 A1 | 8/2010 | De Boer et al. | |
| 2011/0066714 A1 * | 3/2011 | Topham et al. | 709/223 |
| 2011/0246583 A1 | 10/2011 | Vitaldevara et al. | |
| 2011/0314098 A1 * | 12/2011 | Farrell et al. | 709/204 |
| 2012/0057691 A1 | 3/2012 | Moran et al. | |
| 2012/0077467 A1 | 3/2012 | Fan et al. | |
| 2012/0089996 A1 | 4/2012 | Ramer et al. | |

(Continued)

OTHER PUBLICATIONS

Garlan, David et al., "An Architecture for Personal Cognitive Assistance," Proceedings of the 2006 Conference on Software Engineering and Knowledge Engineering, Jul. 5-7, 2006, pp. 1-7. Available at acme.able.cs.cmu.edu/pubs/uploads/pdf/seke06.pdf as of Nov. 8, 2012.

(Continued)

*Primary Examiner* — Nicholas Taylor
*Assistant Examiner* — Chong G Kim
(74) *Attorney, Agent, or Firm* — Ference & Associates LLC (57) ABSTRACT

Methods and arrangements for imparting a communications delay. A delay is dynamically determined for sending an outgoing communication. The determining includes using information derived from at least one of: a social network graph and a business network graph, and the determined delay is applied to the outgoing communication.

14 Claims, 4 Drawing Sheets

(56) References Cited

U.S. PATENT DOCUMENTS

| | | | |
|---|---|---|---|
| 2012/0102153 | A1 | 4/2012 | Kemp et al. |
| 2012/0131141 | A1 | 5/2012 | Alstad |
| 2012/0173632 | A1* | 7/2012 | Chakra et al. .............. 709/206 |
| 2014/0099944 | A1 | 4/2014 | Zisimopoulos et al. |
| 2015/0195232 | A1* | 7/2015 | Haugen ............... H04L 51/18 709/206 |

OTHER PUBLICATIONS

Yu, Bin et al., "An Agent-Based Approach to Knowledge Management," CIKM'02, McLean, Virginia, USA, Nov. 4-9, 2002, pp. 642-644, ACM Digital Library.

Wiltse, Heather et al., "PlayByPlay: Collaborative Web Browsing for Desktop and Mobile Devices," CHI 2009 Social Search and Sensemaking, Boston, Massachusetts, USA, Apr. 4-9, 2009, pp. 1781-1790, ACM Digital Library.

Rahman, MD. Abdur et al., "SenseFace: A Sensor Network Overlay for Social Networks," I2MTC 2009 International Instrumentation and Measurement Technology Conference, Singapore May 5-7, 2009, 6 pages, IEEE, Washington, DC, USA.

McCallum, Andrew et al., "Topic and Role Discovery in Social Networks," University of Massachusetts-Amherst, ScholarWorks@UMass Amherst, 2005, 7 pages, Computer Science Department Faculty Publication Series, Paper 3. Can be found at http://scholarworks.umass.edu/cs_faculty_pubs/3 as Nov. 8, 2012.

Outlook Office, "Delay or schedule sending e-mail messages," Office 2007, 2 pages. Available at http://office.microsoft.com/en-us/outlook-help/delay-or-schedule-sending-e-mail-messages-HP001232817.aspx, as of May 28, 2012.

Chabris, Christopher F. et al., "You Have Too Much Mail," The Wall Street Journal, Dec. 14, 2008, 3 pages, WSJ.com.

Philis, Troy, "Schedule Email in Gmail—Delay Send", Pleasanton Web Design & SEO, Jul. 1, 2010, 10 pages, Available at: http://pleasantonwebdesignblog.com/2010/07/schedule-email-in-gmail-delay-send.html, Accessed on Feb. 11, 2015.

Leggett, Michael, "New in Labs: Undo Send", Official Gmail Blog, Mar. 19, 2009, 2 pages, Available at: http://gmailblog.blogspot.com/2009/03/new-in-labs-undo-send.html, Accessed on Feb. 11, 2015.

* cited by examiner

ESTABLISHING AN AUTOMATIC COMMUNICATIONS DELAY BASED ON SOCIAL OR BUSINESS NETWORK FACTORS

BACKGROUND

Generally, within a personal or professional organization, not everyone is familiar with everyone else. Users that are on the same development team or department may tend to send each other shorter or less structured electronic communications, while users without such a relationship might wish to be more formal in their messages. Conventionally, there are no arrangements for determining such relationships in a manner to tailor or modify the delivery patterns of electronic communications with respect to a given relationship.

It is also very common for users to multi-task within a personal or professional organization. Often, this results in users sending out emails or messages that are not fully formed and thus represent incomplete thoughts. This can present some degree of confusion to recipients of the emails or messages. However, users often find benefit in sending out emails or messages that indeed are not fully formed or complete, e.g., via sending a message to themselves, to quickly remind themselves to follow up on something when otherwise tied up with a matter (e.g., when in the middle of a meeting).

BRIEF SUMMARY

In summary, one aspect of the invention provides a method comprising: dynamically determining a delay for sending the outgoing communication; said determining comprising using information derived from at least one of: a social network graph and a business network graph; and applying the determined delay to the outgoing communication.

Another aspect of the invention provides an apparatus comprising: at least one processor; and a computer readable storage medium having computer readable program code embodied therewith and executable by the at least one processor, the computer readable program code comprising: computer readable program code configured to dynamically determine a delay for sending the outgoing communication; computer readable program code configured to determine the delay via using information derived from at least one of: a social network graph and a business network graph; and computer readable program code configured to apply the determined delay to the outgoing communication.

An additional aspect of the invention provides a computer program product comprising: a computer readable storage medium having computer readable program code embodied therewith, the computer readable program code comprising: computer readable program code configured to dynamically determine a delay for sending the outgoing communication; computer readable program code configured to determine the delay via using information derived from at least one of: a social network graph and a business network graph; and computer readable program code configured to apply the determined delay to the outgoing communication.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made herebelow to FIGS. 1 and 2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1 and 2 can be performed or utilized by way of a processing unit or units and system memory such as those indicated, respectively, at 16' and 28' in FIG. 4, whether on a server computer, a client computer, a node computer in a distributed network, or any combination thereof.

Figure 1:
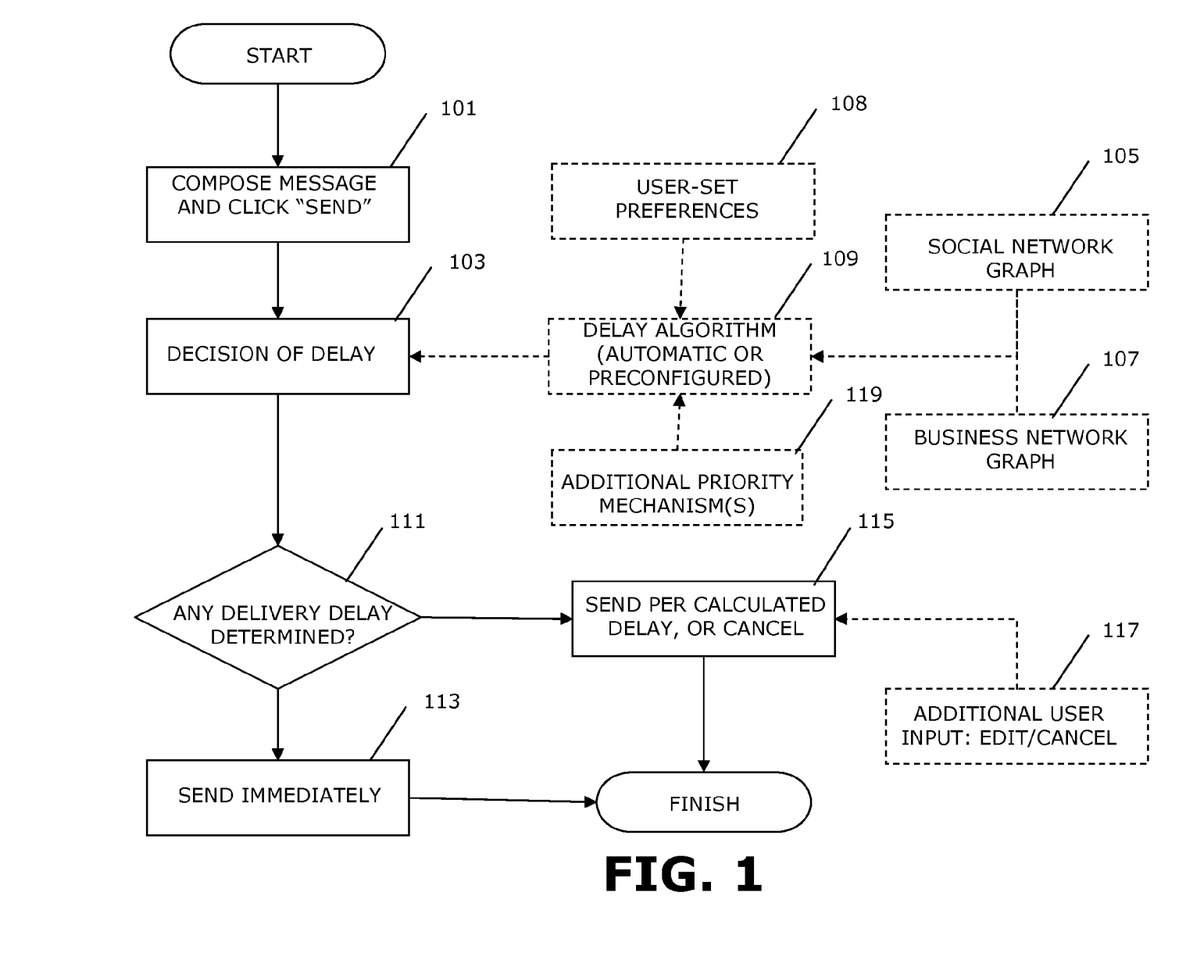
FIG. 1 schematically illustrates a process of delaying a communication relative to input from social and/or business network graphs.
Figure 2:
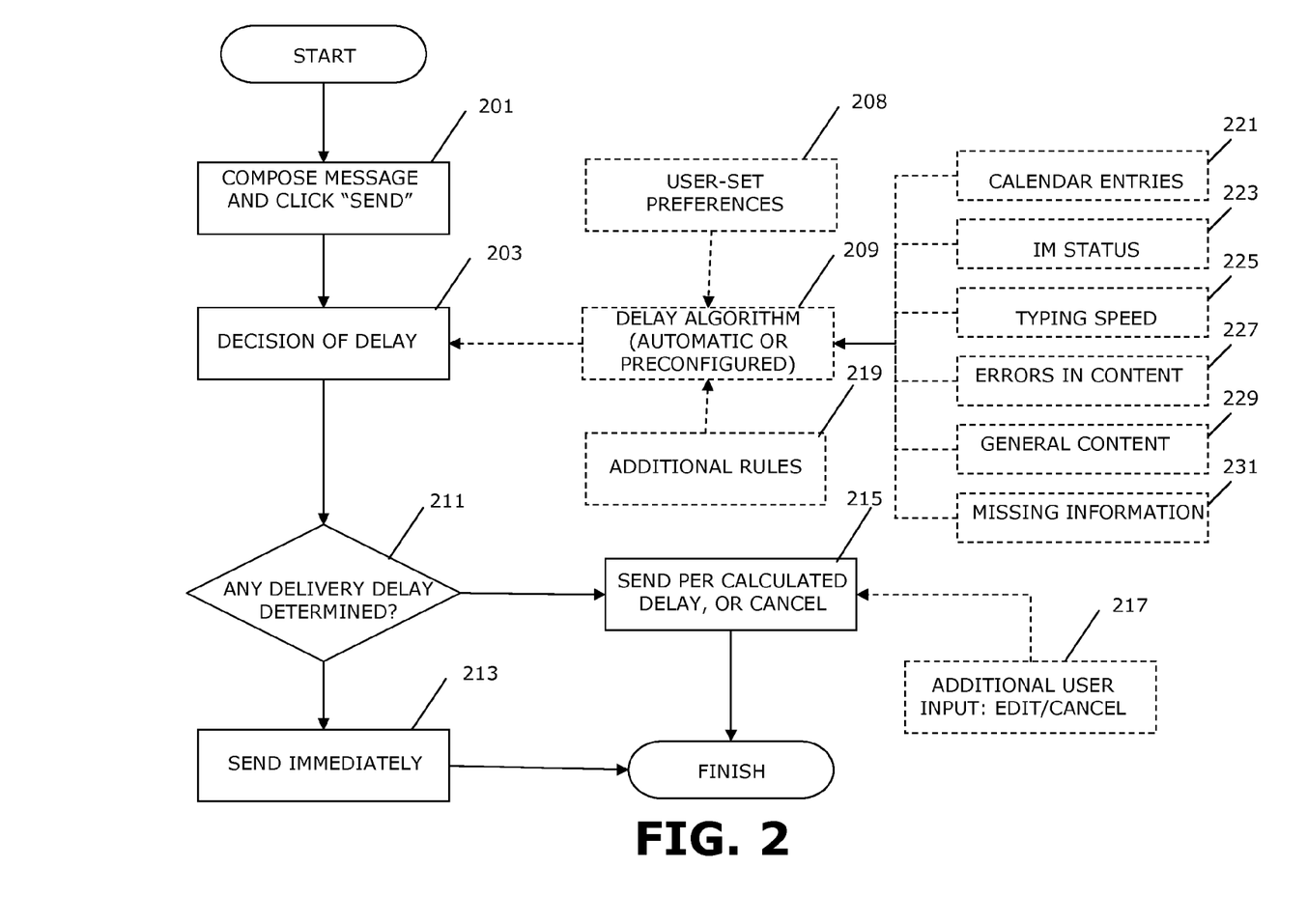
FIG. 2 schematically illustrates a process of delaying a communication relative to a determination of the degree to which a sender is busy.

To facilitate easier reference, in advancing from FIG. 1 to and through FIG. 2, a reference numeral is advanced by a multiple of 100 in indicating a substantially similar or analogous component or element with respect to at least one component or element found in FIG. 1.

Broadly contemplated herein, in accordance with at least one embodiment of the invention, are methods and arrangements for composing a message and then delaying its delivery, or tailoring a delay thereof, based on any of a variety of factors. Such factors can relate to a relationship of the user with the intended recipient(s), e.g., quicker delivery can be undertaken for individuals with whom there is a closer relationship while delivery can be delayed to those individuals that might not be as familiar with a user. Accordingly, this allows the user an opportunity to amend or delete the message before it has been officially delivered. Delivery of a message can also be expedited or delayed relative to the position within a predetermined hierarchy of the sender or receiver, alike. Thus, messages can be delayed, for instance, with respect to important recipients towards the top of a hierarchy (e.g., vice-presidents or CEOs) to permit a user to further refine a response before sending it.

Alternatively, in accordance with at least one embodiment of the invention, a message can be sent out more quickly during less busy times or have a delay applied to it during busier times. This permits a user to review or correct a message that might have been composed in haste, or otherwise without a user's full attention, while he or she may have been busy or distracted.

In accordance with at least one embodiment of the invention, and as shown in FIG. 1, there is broadly contemplated herein a system and method for automatically delaying and/or enhancing outgoing email and calendar entries on a basis of hierarchy and/or social network relationship strength. As such, a user composes an email message or calendar invitation and clicks "send" (101). This triggers a mechanism to automatically decide whether the email should be delayed, and what the delay amount should be (103). This step can be carried out by consulting a social network graph 105, and/or by ascertaining the user's position in a predetermined hierarchy (e.g., via consulting a business network graph 107).

In accordance with at least one embodiment of the invention, if a social network graph 105 is consulted, then any of a wide variety of suitable techniques (e.g., as can be found, for background purposes, in *Social Network Analysis: Methods and Applications [Structural Analysis in the Social Sciences]*, Stanley Wasserman, Katherine Faust, Cambridge University Press, 1st Edition, 1994) can be employed to mine information relative to a user's interactions on social network and media platforms. The social network graph 105, as such, will include people that are in the sender's network and the sender's strength of relationship with them. Depending on the relationship strength between the sender and the intended recipients of the email or calendar invitation, the email may end up being delayed. The degree of delay can be configured based on relationship strength. For instance, if the relationship is very strong, the email could be delayed, e.g., by less than about 10 minutes while if it is very weak then it could be delayed, e.g., by about 20 minutes. A variety of suitable mechanisms for determining relationship strength are possible. These include, but by no means are limited to, determining a frequency of contact (between people in a direct relationship) and determining a degree of separation, or number of intervening people (between people in an indirect relationship, or a relationship that is not direct).

In accordance with at least one embodiment of the invention, other metrics that can be considered in determining relationship strength are "betweenness" and "centrality". Generally, the centrality of a vertex within a graph refers to the relative importance of a vertex within the graph (i.e., how influential a person is within a social network), while betweenness is a centrality measure of a vertex within a graph (initially introduced as a measure for quantifying the control of a human on the communication between other humans in a social network in: Freeman, Linton [1977], "A set of measures of centrality based upon betweenness", *Sociometry* 40: 35-41.) Generally, it can be stated that vertices that have a high probability to occur on a randomly chosen shortest path between two randomly chosen nodes have a high degree of betweenness. In accordance with at least one embodiment of the invention, the email may be delayed, alternatively or in addition, by a mechanism that determines the sender's position in a hierarchy in relation to the recipients of the email (e.g., the sender's position in a business network graph 107). As such, in accordance with at least one embodiment of the invention, by way of input, a hierarchy can be assimilated as typically may be available in internal corporate Intranet sites that allow directory lookup of each employee. Information such as the following can thus be derived: the employee's direct reports (i.e., the individual[s] to whom the employee directly reports), the employee's title and the employee's manager.

In accordance with at least one embodiment of the invention, by way of another input, the user may pre-set one or more preferences relating to one or more recipients (108), which can set at least a base or minimum delay for the one or more recipients as may be chosen by the user.

Generally, in accordance with at least one embodiment of the invention, any delay amount per recipient may either be computed automatically by an algorithm or configured by the sender (e.g., in an initial configuration step), or via a combination of both (109). If (111) a justification for a delivery delay is not determined, then the message is sent immediately (113). If one or more conditions relating to a delivery preference are met, however, the message is delayed and then sent (115) based on the preferences set by the sender. (It should be understood here that various types of preferences or delays could be implemented that may relate to any of a variety of factors. A binary preference can relate to whether to use a delay feature at all, thus, this can be set as "on" or "off". A second individual-specific preference is described above with relation to setting a "minimum". A third, more general preference can relate to a base unit of delay, e.g., hours, days or weeks.) Further (or alternatively), the user may optionally edit delayed messages to add after-thoughts, re-phrase sentences or even cancel the message altogether (117).

In accordance with at least one embodiment of the invention, one or more additional message priority mechanisms 119 can be applied in addition to the mechanisms discussed immediately above. For instance, the organization may already have an email server which determines the relative priority of a message based on the sender's position in the organization's hierarchy. For example, hundreds of messages could be sent at the same time and may be queued up in the email server's message queue. The email server may then act to order the messages such that those from an individual at the top of a hierarchy (e.g., a director) are placed first in the outgoing message queue, while others (e.g., messages about printer status and house cleaning requests) will be placed later in the queue. Alternatively, the relationship of a user to a more important user could bump the overall relationship rating of a user. For example, if CEO "Ed" has a high priority rating, his administrative assistant ("admin") "Andy" may have a lower one purely on the basis of relative position in the hierarchy. However, since Andy is Ed's admin, his relationship in relation to Ed accords him a higher priority as well. This would be useful, e.g., when trying to access the calendar of an individual who works through his or her admin in order to set up meetings.

In accordance with at least one embodiment of the invention, it can be appreciated that a perceived risk of rapid delivery can factor into an algorithm (109) for calculating a delay in message delivery. For instance, for messages that go to higher-ranking people in a hierarchy (e.g., corporate officers) or that are delivered externally (e.g., to customers), then a delay (or more of a delay) could indeed be inserted. During the delay, the sender would be able to reconsider the message, and thereby modify or even delete it.

In accordance with at least one embodiment of the invention, and as shown in FIG. 2, arrangements are provided for determining the degree to which a user can be considered to be busy (whether perceived or specified), and this can inform a quantitative decision to delay an outgoing email or other message or communication. Such a determination can be made on the basis of several factors, which may include any or all of the following: calendar entries (221); an instant messaging status that indicates "busy" or "in a meeting" during the period within which the email or calendar invite is being composed (223); a user's typing speed (e.g., as measured in words per minute) while an email or calendar note is being composed, and how it compares to user's average typing speed (225); a quantity of spelling or grammatical errors in the written content of email or calendar invite, or the lack (or type) of a signature (227); and the general content of an email or calendar invite (e.g., the presence or lack of specific keywords) (229). Another factor could be represented by the lack of pertinent information in an email or calendar invite, such as missing a proposed time or venue to meet, call-in number, etc (231). Such information can be determined, by way of at least one illustrative example, via a conventional text analysis technique and/or via simply detecting presence or absence of a word, phrase or string in a communication.

In accordance with at least one embodiment of the invention, user-specific rules or preferences 208 can be set (instead of or in addition to measures such as those just discussed) to specify a delay length. For instance, such rules or preferences could include the role of one or more email recipients and the respective degree to which each is busy. By way of illustrative example, if the recipient is a developer and the sender is extremely busy, sending an email immediately may be warranted. However, if the potential recipient is a marketing executive, then the delivery delay might be longer. Rules for specific users can also be applied, e.g., no delay is ever applied to user X while one is always applied to user Y.

In accordance with at least one embodiment of the invention, when a user attempts to send an email (201), the degree to which he or she is busy is then calculated via an automatic or preconfigured algorithm 209 (using inputs such as those discussed above) in accordance with deciding a delay, if any (203). If a delivery delay is not determined, the email is sent immediately (213). Otherwise, the email is then delayed with respect to the determined time interval (215), with the user having the opportunity to provide additional input or cancel the message (217), e.g., in a manner similar to that described hereinabove with respect to FIG. 1.

In accordance with at least one embodiment of the invention, one or more rules 219 can be configured in addition to (or by way of operating in sequence with, or as an alternative with respect to) a calculated delay. For instance, if the email is related to a project involving a group of people and, inadvertently, the sender has not included all group members in the address (and, e.g., the email is not confidential or marked "do-not-forward"), then the system can automatically add the missing group member(s) to the email and also delay the message (wherein the system would prompt the user to approve the changes in the recipient list before sending). If two or more emails are delayed by a different time amounts and each email is related to separate people in a group that normally receives emails all at once (e.g., via a distribution list), then the delay for each email is synchronized in order to make sure that the group recipients receive the messages at the same time so that the response is coordinated. The system prompts the user to approve the changes before sending. (In this vein, the system can be configured to default on the side of sending the email either at the later time interval, or alternatively at the earlier time interval. In either case, the user can be prompted to approve the synchronized sending of the email to the different recipients before it does get sent.)

By way of an illustrative example in accordance with at least one embodiment of the invention, a group might include Gary, Mark and Rachel, with Rachel being an email sender. During a meeting, Rachel might hastily compose a message to Gary, copying Mark. Also during the meeting, Rachel might hastily compose a message to Mark, copying Gary. A module for determining a degree of being busy calculates a sending delay with respect to each of the two emails. However, an additional synchronization measure is applied since each email is intended for a person belonging to the same group, whereupon the messages then leave Rachel's outbox at the same time. Alternatively, when sufficient time has elapsed to satisfy the sending delay criterion, the system could combine emails to similar participants (e.g., to participants in the same distribution group). In accordance with the present example, then, only a single email need be sent from Rachel to Gary and Mark, rather than two separate messages (whereby the system could prompt Rachel for her approval before condensing into a single message).

In accordance with at least one embodiment of the invention, as part of the user preferences 208 and/or additional rules 219, a sending delay can be configured according to the person or group to whom the outgoing email or calendar invite is being sent to by the user. For example, the user can configure the module for determining a degree of being busy and select delay ranges for individuals or groups within their email contact list. As such, by way of a specific working example, Bob may be attending a live presentation, while also talking to five coworkers via another desktop communications interface and speaking over the phone on a teleconference. An automatic delay setting may then recognize a "high" busy-ness factor and set a base email delay of 15 minutes. (This indeed can represent a base delay, wherein an additional per-person or per-group delay can be applied on top of it. For its part, an individual's participation in the teleconference can be detected through any of a variety of suitable mechanisms, such as via consulting an online calendar, or via voice analysis with respect to the conversation in real-time.) On the other hand, if he has no conversations open through a communications interface and has nothing but free space on his calendar, the system will recognize a "low" busy-ness factor, and will delay outgoing messages by only 5 seconds.

It should be understood, in accordance with at least one embodiment of the invention, that while the sending of emails is discussed herein as a use case, other forms of communication may also be embraced by way of instituting sending delays based on different factors. Such other forms include, but by no means are limited to, electronic calendar invitations, blog posts, online discussion contributions, targeted microblog posts, updates to shared task management systems, and so on.

Generally, it can be appreciated that a very wide variety of capabilities are afforded or permitted in accordance with embodiments of the invention. By way of example, while a delay can indeed be applied to an outgoing email with respect to an intended recipient, delay can also be applied collectively to a set of emails belonging to several different intended recipients, as received by an email server queue. In other words, a delay with respect to any emails that arrive at a queue, or with respect to given emails fulfilling predetermined conditions, may be applied instead of or in addition to a delay that was specifically established at the sender's end.

By way of another feature permitted in accordance with embodiments of the invention, it will be appreciated that the establishment of delays and association of the same with one or more emails can permit a sender to effectively change the order of outgoing messages. The sender may approach such ordering consciously, or may be provided with an overview of a current prospective order of emails based on their applied delays. The sender may then configure delays for additional emails on an individual basis to fall within the prospective order as may be desired, or could even be provided with a capability to merely proactively choose a "position" of the email within the prospective order, whereby a delay would automatically be calculated to place that email in the chosen position (e.g., if it is chosen for the third position, or "between second and third", a delay could be calculated that is midway between those applied for emails currently in the second and third positions).

Figure 3:
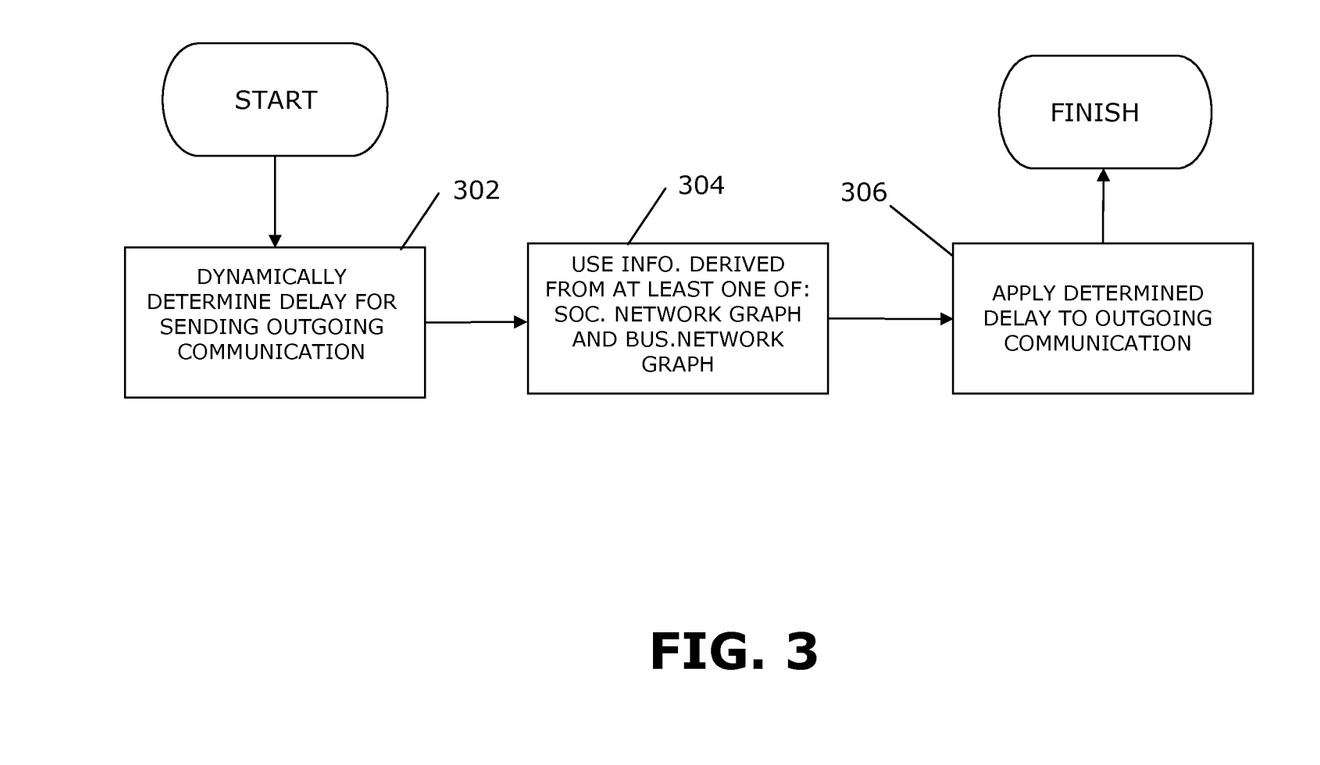
FIG. 3 sets forth a process more generally for imparting a communications delay.

FIG. 3 sets forth a process more generally for imparting a communications delay, in accordance with at least one embodiment of the invention. It should be appreciated that a process such as that broadly illustrated in FIG. 3 can be carried out on essentially any suitable computer system or set of computer systems, which may, by way of an illustrative and non-restrictive example, include a system such as that indicated at 12' in FIG. 4. In accordance with an example embodiment, most if not all of the process steps discussed with respect to FIG. 3 can be performed by way of a processing unit or units and system memory such as those indicated, respectively, at 16' and 28' in FIG. 4.

As shown in FIG. 3, in accordance with at least one embodiment of the invention, a delay is dynamically determined for sending an outgoing communication (302). The determining includes using information derived from at least one of: a social network graph and a business network graph (304), and the determined delay is applied to the outgoing communication (306).

Figure 4:
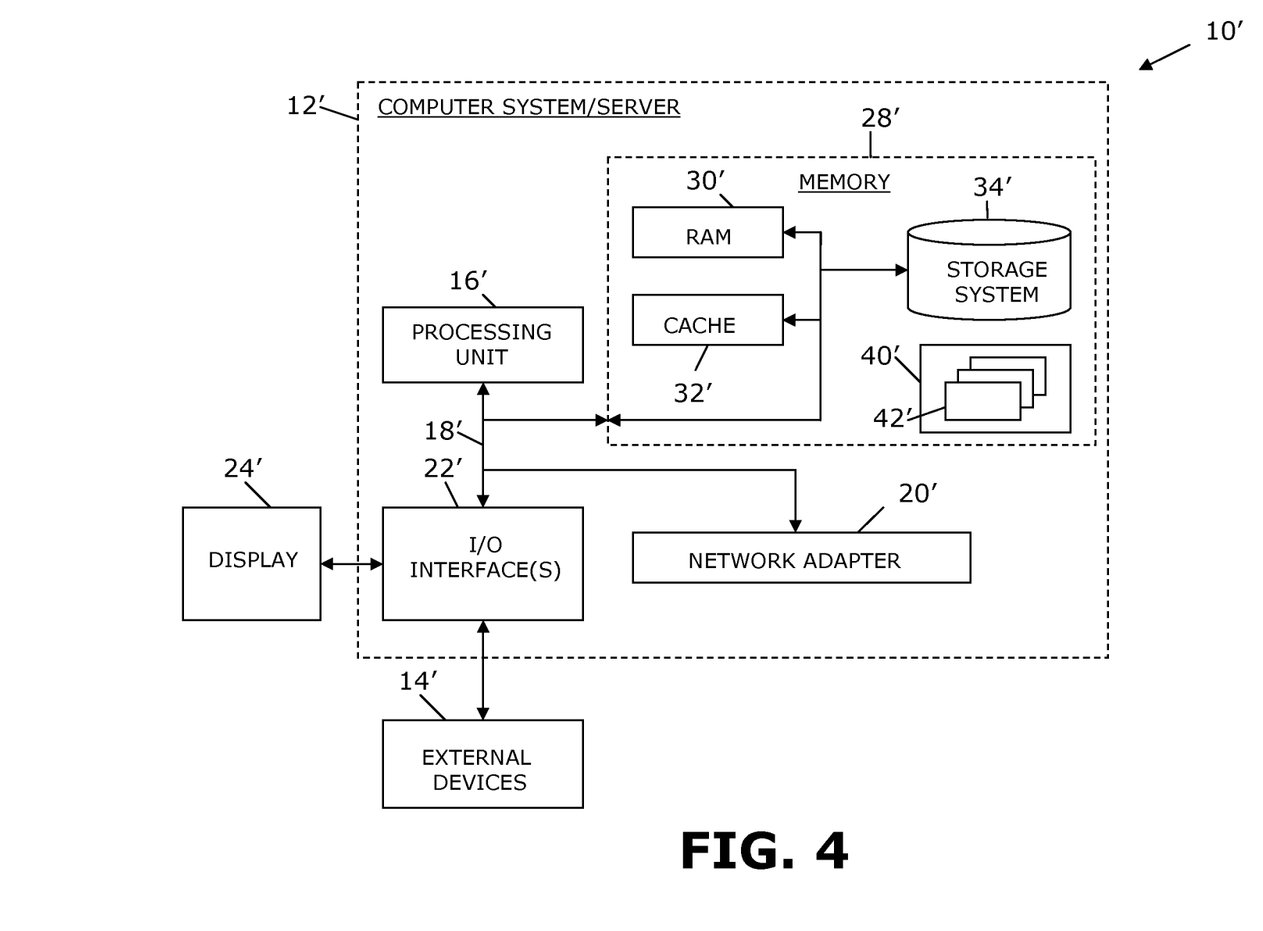
FIG. 4 illustrates a computer system.

Referring now to FIG. 4, a schematic of an example of a cloud computing node is shown. Cloud computing node 10' is only one example of a suitable cloud computing node and is not intended to suggest any limitation as to the scope of use or functionality of embodiments of the invention described herein. Regardless, cloud computing node 10' is capable of being implemented and/or performing any of the functionality set forth hereinabove. In accordance with embodiments of the invention, computing node 10' may not necessarily even be part of a cloud network but instead could be part of another type of distributed or other network, or could represent a stand-alone node. For the purposes of discussion and illustration, however, node 10' is variously referred to herein as a "cloud computing node".

In cloud computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12' in cloud computing node 10 is shown in the form of a general-purpose computing device. The components of computer system/server 12' may include, but are not limited to, at least one processor or processing unit 16', a system memory 28', and a bus 18' that couples various system components including system memory 28' to processor 16'.

Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and includes both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

It should be noted that aspects of the invention may be embodied as a system, method or computer program product. Accordingly, aspects of the invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the invention may take the form of a computer program product embodied in at least one computer readable medium having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store, a program for use by, or in connection with, an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the invention may be written in any combination of at least one programming language, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture. Such an article of manufacture can include instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
  receiving, from a user, a send request for an outgoing communication, wherein said outgoing communication comprises a first outgoing communication;
  upon receiving the send request, dynamically determining a delay for sending the outgoing communication via a combination of: automatic computation, and configuration by the user;
  said determining of the delay comprising using:
    information derived from influential hierarchy within a network graph which represents a plurality of individuals, wherein the hierarchy is determined from a directory look up of one or more individuals in the network graph;
    relative hierarchy of the user within the network graph;
    determination of a relationship strength, based on:
      ascertaining a direct relationship;
      determining a frequency of contact;
      centrality of a vertex within the graph, wherein the centrality refers to an individual's relative importance as a vertex within the network graph; and
      betweenness as a measure for quantifying control of one or more individuals on communication with one more other individuals in the network graph;
    determination of risk of rapid delivery of the outgoing communication;
    using at least one user-set preference;
  said determining comprises synchronizing the delay with another determined delay with respect to a second outgoing communication; and
  applying the synchronized delay to the first and second outgoing communications.

2. The method according to claim 1, wherein said determining further comprises using at least one quantitative priority consideration.

3. The method according to claim 1, further comprising according user opportunity to edit or cancel the outgoing communication during the determined delay.

4. The method according to claim 1, wherein said determining comprises ascertaining a relationship strength on the basis of an indirect relationship.

5. The method according to claim 4, wherein said ascertaining comprises determining a degree of separation.

6. The method according to claim 1, wherein:
  said using comprises using information derived from a business network graph; and
  said ascertaining comprises determining a relationship with respect to a professional hierarchy.

7. The method according to claim 1, wherein the first and second outgoing communications include at least one intended recipient in common.

8. The method according to claim 1, wherein:
  the outgoing communication includes at least one intended recipient; and
  said method further comprises adding at least one additional intended recipient automatically.

9. An apparatus comprising:
  at least one processor; and
  a computer readable storage medium having computer readable program code embodied therewith and executable by the at least one processor, the computer readable program code comprising:
    computer readable program code that receives, from a user, a send request for an outgoing communication, wherein the outgoing communication comprises a first outgoing communication;
    computer readable program code that, upon receiving the send request, dynamically determines a delay for sending the outgoing communication via a combination of: automatic computation, and configuration by the user;
    computer readable program code that determines the delay via using:
      information derived from influential hierarchy within a network graph which represents a plurality of individuals, wherein the hierarchy is determined from a directory look up of one or more individuals in the network graph;
      relative hierarchy of the user within the network graph;
      determination of a relationship strength, based on:
        ascertaining a direct relationship;
        determining a frequency of contact;
        centrality of a vertex within the graph, wherein the centrality refers to an individual's relative importance as a vertex within the network graph; and
        betweenness as a measure for quantifying control of one or more individuals on communication with one or more other individuals in the network graph;
      determination of risk of rapid delivery of the outgoing communication;
      using at least on user-set preference;
    said determining comprises synchronizing the delay with another determined delay with respect to a second outgoing communication; and computer readable program code configured to apply the synchronized delay to the first and second outgoing communications.

10. A computer program product comprising:

a non-transitory computer readable storage medium having computer readable program code embodied therewith, the computer readable program code comprising:

computer readable program code that receives, from a user, a send request for an outgoing communication, wherein the outgoing communication comprises an email;

computer readable program code that, upon receiving the send request, dynamically determines a delay for sending the outgoing communication;

the delay being determined via a combination of: automatic computation, and configuration by the user:

computer readable program code that determines the delay via using:

information derived from influential hierarchy within a network graph which represents a plurality of individuals, wherein the hierarchy is determined from a directory look up of one or more individuals in the network graph;

relative hierarchy of the user within the network graph;

determination of a relationship strength, based on:
ascertaining a direct relationship;
determining a frequency of contact;
centrality of a vertex within the graph, wherein the centrality refers to an individual's relative importance as a vertex, within the network graph; and
betweenness as a measure for quantifying control of one or more individuals on communication with one or more other individuals in the network graph;

determination of risk of rapid delivery of the outgoing communication;

using at least one user-set preference;

said determining comprises synchronizing the delay with another determined delay with respect to a second outgoing communication; and computer readable program code configured to apply the synchronized delay to the first and second outgoing communications.

11. The computer program product according to claim 10, said computer readable program code is configured to accord user opportunity to edit or cancel the outgoing communication during the determined delay.

12. The method according to claim 1, wherein the send request comprises a plurality of outgoing communications;

wherein a relative sending priority is determined based on the relative hierarchy; and wherein the determined delay is modified based on the sending priority.

13. The apparatus according to claim 9, wherein the send request comprises a plurality of outgoing communications;

wherein a relative sending priority is determined based on the relative hierarchy; and wherein the determined delay is modified based on the sending priority.

14. The computer program product according to claim 10, wherein the send request comprises a plurality of outgoing communications;

wherein a relative sending priority is determined based on the relative hierarchy; and wherein the determined delay is modified based on the sending priority.

\* \* \* \* \*